(12) United States Patent
Condamoor et al.

(10) Patent No.: US 7,003,486 B1
(45) Date of Patent: Feb. 21, 2006

(54) NET-VALUE CREATION AND ALLOCATION IN AN ELECTRONIC TRADING SYSTEM

(75) Inventors: Ravi V. Condamoor, Sunnyvale, CA (US); Ankur Datta Sharma, Sunnyvale, CA (US); Neelakantan Sundaresan, San Jose, CA (US)

(73) Assignee: Neha Net Corp., San Jose, CA (US)

( * ) Notice: Subject to any disclaimer, the term of this patent is extended or adjusted under 35 U.S.C. 154(b) by 0 days.

(21) Appl. No.: 09/578,174

(22) Filed: May 24, 2000

Related U.S. Application Data

(60) Provisional application No. 60/198,125, filed on Apr. 17, 2000.

(51) Int. Cl.
*G06F 17/60* (2006.01)

(52) U.S. Cl. .......................................... 705/37; 705/38
(58) Field of Classification Search ............ 705/25–40, 705/1, 80
See application file for complete search history.

(56) References Cited

U.S. PATENT DOCUMENTS

| | | | |
|---|---|---|---|
| 4,845,625 A | 7/1989 | Stannard ..................... 364/407 |
| 5,630,076 A | 5/1997 | Saulpaugh et al. ......... 395/284 |
| 5,797,127 A | 8/1998 | Walker et al. ................. 705/5 |
| 5,797,207 A | 8/1998 | Walker et al. ............... 705/23 |
| 5,845,266 A | 12/1998 | Lupien et al. ................ 705/37 |
| 5,864,827 A * | 1/1999 | Wilson ......................... 705/35 |
| 5,873,071 A | 2/1999 | Ferstenberg et al. .......... 705/37 |
| 5,897,620 A | 4/1999 | Walker et al. ................. 705/5 |
| 5,911,131 A | 6/1999 | Vig ................................ 705/1 |
| 5,950,177 A | 9/1999 | Lupien et al. ................ 705/37 |
| 5,960,407 A | 9/1999 | Vivona ......................... 705/10 |
| 6,026,384 A | 2/2000 | Poppen ....................... 705/400 |
| 6,035,289 A | 3/2000 | Chou et al. ................... 705/37 |
| 6,038,554 A | 3/2000 | Vig ............................. 705/400 |

(Continued)

FOREIGN PATENT DOCUMENTS

EP         A 0407 026 A2 *    5/1991

(Continued)

OTHER PUBLICATIONS

"Agent Mediated Electronic Commerce. First International Workshop on Agent Mediated Electronic Trading", AMET-98, Year 1999, Dialog file 2, Accession No. 6390685.*

(Continued)

*Primary Examiner*—Frantzy Poinvil
(74) *Attorney, Agent, or Firm*—Stuart T. Auvinen

(57) ABSTRACT

An electronic exchange creates and distributes value among trading partners in a trade. Trading agents for the trading partners use a value manager to store true values for a trading element in the trade. The true values are the values perceived by the trading partner, but are not shown to other trading partners. These true values vary with attributes of the trading element. The attributes modify the trading element and are valued differently by different trading partners. A trade manager receives offers from trading agents. The offers are sent with the true values and the attribute values. The trade manager compares true values of buyers and sellers across a range of attribute values. Net values are computed as the difference of a buyers' sum and a sellers' sum. The buyers' sum is the sum of all true values from buyer trading agents, while the sellers' sum is the sum of the true values of all seller trading agents. The trade manager finds a set of attribute values that has a maximum net value. The trade is conducted for the trading element with the attributes that maximizes the net value. The net value is then allocated among the electronic exchange and the buyer and seller trading partners.

28 Claims, 8 Drawing Sheets

U.S. PATENT DOCUMENTS

| | | | |
|---|---|---|---|
| 6,047,274 A | 4/2000 | Johnson et al. | 705/412 |
| 6,058,379 A * | 5/2000 | Odom et al. | 705/37 |

FOREIGN PATENT DOCUMENTS

| | | | |
|---|---|---|---|
| WO | WO 98/41942 | * | 9/1998 |

OTHER PUBLICATIONS

Sbase.com markets, technology web pages, Mar. 16, 2000.

Kaplan & Sawhney, "B2B E-Commerce Hubs: Towards a taxonomy of Business Models", Dec. 1999.

Roddy, "The Evolution of Digital Markets", Tradeum, Inc, Jan. 2000.

Opensite, "The Dynamic Pricing Revolution", 1999.

Bichler, Kaukal, & Segev, "Multi-Attribute auctions for electronic procurement", IAC's Workshop on Internet Based Negotiation Technologies, Mar. 18-19, 1999, pp 1-13.

Tradeum, Inc, "Digital Marketplace Technology", Feb. 2000.

* cited by examiner

NET-VALUE CREATION AND ALLOCATION IN AN ELECTRONIC TRADING SYSTEM

RELATED APPLICATION

A provisional patent application entitled "System and Method for Value Creation in an Electronic Trading System" was filed on Apr. 17, 2000 by the same inventors for the present application, U.S. Provisional Appl. No. 60/198,125.

FIELD OF THE INVENTION

This invention relates to electronic trading systems, and more particularly to dynamic pricing for electronic exchanges.

BACKGROUND OF THE INVENTION

In an electronic exchange buyers and sellers set prices for items to be purchased or sold. Exchanges have a mechanism that matches up buyers and sellers and establishes a market-clearing price for the item being bought or sold. Buyers buy the product at the market price and sellers sell the product at the market price. The market-clearing price is dynamic and set by market supply and demand conditions. The price is influenced by dynamic negotiations among buyers and sellers and other market conditions.

Exchanges today facilitate trade by enabling buyers, sellers, and other trade participants, who could otherwise not have participated in the trades, to take part in the trade. This is done by providing market liquidity where buyers can find sellers and sellers can find buyers. In addition, a common information base is provided so that sellers and buyers can understand each other, by providing settlement and fulfillment services that the trading partners can use to consummate the deal.

In several electronic exchanges, aggregation is used to group buyers with similar buying interest or sellers with similar selling interests to enable them to participate in trades in which they would not have qualified to participate in individual capacity. For instance, a buyer requiring 5 pounds of sugar may not be able to participate if all the sellers in the sugar exchange sell a only a minimum of 1000 pounds. Aggregating buyers or sellers on these exchanges gives the aggregated or "virtual" buyer or seller greater leverage in negotiating with the other parties and thus establishing prices more favorable to the aggregated virtual party. Thus, aggregation allows buyers or sellers who may otherwise not have participated in the trade to participate in the trade on terms favorable to them and thus creates value for the aggregated set of trading partners.

Several exchanges today allow many trading partners to participate in a single trade where each trading party participates in one aspect of the trade. Each aspect of such a trade is called a trading element. A trading element can be a product or a service either consumed by or provided by a trading partner. Thus a buyer can participate in a trade that includes one or more products or services (trading elements) and each trading partner might buy or sell one of the many trading elements in the product. For example, a trade of buying books over the internet involves 3 trading elements:

1. the book itself, provided by the online bookstore,
2. the shipping service from the shipping company, and
3. the sales tax component charged for a service delivered by the local or the state government.

This model can easily be extended to include other trading elements, such as the publisher, resellers, author etc. that could potentially participate directly or indirectly in the trade.

Revenue Models

All Electronic trading systems require a revenue model by which trading partners and the electronic exchange or the trading system generate revenues and profits. Providers of electronic trading systems generate their revenue from a number of revenue streams.

Current Revenue Models: In today's electronic commerce systems revenue generated is based on commerce, content, collaboration, and services.

Commerce-Based Revenue Models:

1. Transaction Fees: A percentage of the transaction is charged as a fee. Fees usually range from 0.5% of the transaction to 8% on more complex transactions. Most of the exchanges settle in the 1–2% commission range for catalog orders. Some exchanges charges flat fees for processing transactions–$1.00 for a purchase order. They may have additional charges for different types of fees (invoice, payment, shipping document, bill presentment, and cash transfer).
2. Auction Services: Auction services also charge (though higher, typically) a percentage of the auction transaction as fees. Typical exchanges charge 3% but the fees are headed down as auctions become commonplace. Commerce One offers auction services at a 1% service fee.
3. Mark up—Some exchanges take the title to goods and mark up the goods to what the market will bear. Here the markup typically ranges from 5–10%. The risk in this revenue model is that the margin for the exchange is dependent on product pricing.
4. Membership/Storefront fees—are charges to a merchant to list its catalog and promotional material in a segmented storefront in the exchange. These fees range from zero to a few thousand dollars. This is similar to personal web-page hosting. Some exchanges use this model by selling a member-supplier a separate segment in the marketplace to post its wares.
5. License Fees—Some exchanges develop proprietary software for use at the buyer's and seller's site, and charge for this.

Content-Based Revenue Model:

In a content-based revenue model, revenue may come from advertising fees, catalog fees, or fees for collecting statistics about aspects of market behavior. The advertising model is similar to the business-to-consumer (B2C) space where topic-specific or general advertisements are hosted and fees charged may be based on click-through or similar concepts. In the catalog world, service charges are applied for hosting, maintaining and cleaning up product catalogs for trading partners (such as buyers, sellers or facilitators). Another dimension of the revenue comes from obtaining and selling important statistics about different aspects of market behavior.

Collaboration Revenue:

Here the exchange allows different trading partners to collaborate as part of the trading process. The exchange could charge for the coordination of this and for managing the workflow between members of the demand and supply chain.

Third-Party Services:

Exchanges could host or sell other third party goods and services and charge for those. The branding and reputation of the exchanges could make this attractive.

Start-up Costs:

Exchange start-up costs may run into a few million dollars. Outsourcing the infrastructure to existing exchanges (Such as Ariba or CommerceOne) which have built-in capabilities generates revenue for these exchanges. However, startup costs are falling as more standardized software becomes available.

In summary, the current trading systems and exchanges enhance trade by aggregating trading partners and by allowing trading partners supporting or interested in different trading elements of the trade to participate simultaneously in the trade. However, they do not have a facility for enabling trading partners to define how they value the different trading elements based upon their attributes.

Neither do theses trading exchanges have a system that settles trades in such a way that the trading partners participate at a price at least as good as the value they attach to the different trading elements. Trading systems or exchanges generate revenue in a static manner mainly for enabling trade or other services at the exchange. The system makes revenue whether or not the trade was a good deal for the trading partners. This model gives the trading systems operators an incentive to increase transaction quantity at the expense of quality. The actual commission charged is often disputed by or negotiated with buyers or sellers and is vulnerable to competitive undercutting.

The presence of a commission based on transaction volume also gives buyers and sellers a perverse incentive to close the deal outside the trading system. The revenue model thus adversely affects customer loyalty towards the trading system. The current revenue model thus is a less than ideal model for trading partners and trading system providers.

What is desired is a trading system that enables trading partners to define how they value the different trading elements based upon their attributes. A trading system that is sensitive to value placed on each trading element by trading partners is desired. A revenue model for the exchange that is not based on fixed transaction fees or commissions is desired.

SUMMARY OF THE INVENTION

The present invention describes a system, method, and apparatus for Value Creation in an electronic exchange or trading system. In the embodiments of the invention, all trading partners can specify their True Value for the product or for a given trading element within the product. The system then settles trades such that each trading partner in the trade settles the trade at a price equal to or better than their True Value that the particular trading partner associates with the product or trading element being bought or sold in the trade.

The present invention also introduces a revenue model in electronic marketplaces where the revenue generation and distribution is a function of the overall value created by the trading system for the trading partners. In this revenue model the value that is created by the trading system is distributed among all the trading partners and the exchange. The distribution of the value itself among the trading partners and the exchange could be pre-negotiated or could be dynamically negotiated and decided during the transaction.

In embodiments of the invention, trades are defined to be compound trades. A trade instance consists of one or more trading elements. Each trading element is categorized as belonging to a given Service Category. A trading partner can provide or consume trading elements in one or more Service Categories. For given Service Categories, a trading partner can play the role of a buyer or consumer of one or more trading elements, a seller or provider of one or more trading elements, or a facilitator of one or more trading elements or of the overall compound trade.

The invention allows any trading partner to associate a True Value based upon the different factors or attribute values of the particular trading element. This True Value reflects the true or actual value that a given trading partner places on a trading element. The invention allows trading partners belonging to the same or to different multiple service categories to participate in a trade with one or more trading elements. The system then settles trades such that all trading partners settle at a price that is equal to or better than the True Value that each trading partner associates with the trade.

TERMINOLOGY

Figure 1A:
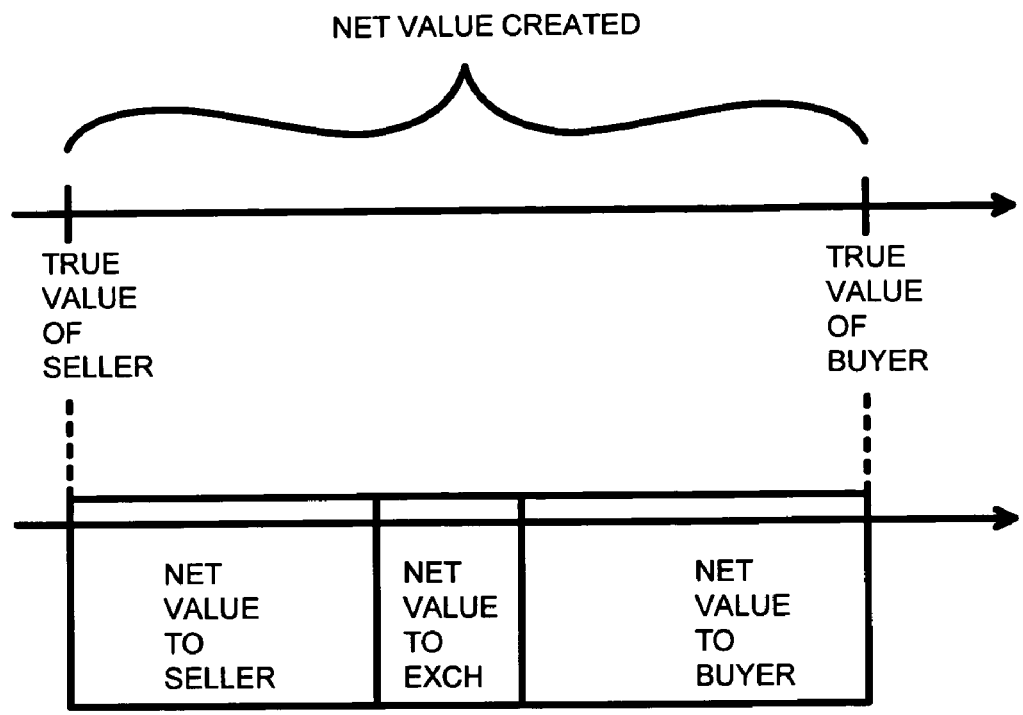
FIG. 1A is a diagram showing true values placed on a product by the buyer and by the seller in a simplified 2-party trade.

1. Electronic Commerce—Commerce conducted over an electronic medium
2. Electronic Exchange—A platform in which providers of goods and services buy, sell, and exchange those entities.
3. Utility Function—defines a function used to define the value of a product. Typically this is the price in some units like dollars or pounds at which the buyer is willing to buy or the seller is willing to sell.
4. Delta—A quantifiable vested interest of a trading partner. Different trading partners usually have different aspects of a trade that they value the most. For example, One might have price, the other may be concerned about quality, and the third might care about quantity and delivery time. The Delta is a manifestation of their preferences and can be positive or negative; positive indicates that the trading partner cares more about it and negative connotes the trading partner is less interested in that particular attribute of a trade.
5. Product (Product and Service used interchangeably)
6. Base Product Value—is the utility function value (typically price) at which a trading partner starts valuing a product.

7. Delta Product Value—is the utility function value (typically price) of the product with the deltas for the attributes accounted for.
8. Trade—A trade is an activity in which one or more parties provide services or goods to one or more parties at a pre-calculated or at a dynamically decided or negotiated cost.
9. Service category—Types of goods and services
10. Trading Partner—A buyer/seller/facilitator in a multi-party trade. Also a service provider.
11. Attribute—An abstract data type that provides a mechanism for Trading Partners to describe their product/service to a finer level of granularity taking into account the strengths and weaknesses of the trading partners. Application or Industry specific attributes may be defined by subclassing the base Attribute class. Example: Date, Location, Weight are all attributes in the system.
12. Attribute Value—Quantifiable values assigned to Attribute instances. Example: Jun. 1, 2000 is the attribute value assigned to a Date attribute.
13. Trading Elements: components of a trade. Each trading element can be a product or a service. Each trading element belongs to a product or a service category. Each trading element is provided by a service provider.
14. Compound or Multi-element trades: Trades in the system can include one or more trading elements, where each trading element can be a service or a product provided by one or more than one trading partners.
15. Buyer: A trading partner who pays a price for one or more goods or services
16. Seller: A trading partner who charges a price for one or more goods or services.
17. Facilitator: A trading partner who enables the trade by providing support for a trading element that is required to complete the trade. For example, a shipping company providing shipping facilities from the seller to the buyer is a facilitator. Facilitators charge a price for their service. Buyers and sellers may have a choice of facilitators and facilitators may be interested in one or more aspects of the trade. For instance, a shipping company might attach higher value to items that weigh less than 5 pounds.
18. True Value: True Value (TV) defines the price that a trading partner believes a product is actually worth. The TV is the true value that a given trading partner places on a given product. This depends on the attributes of the product and the importance given by the partner to each attribute, on the priorities and objectives of the trading partner, and on market conditions. Price is used as a general measure for value. In another embodiment, a different measure can be used.
19. Net Value: Net Value (NV) defines the overall value created in a trade. The NV is the surplus left after the TVs of all the trading partners are aggregated. The NV is the difference between the sum of the TVs of all trading partners who pay for obtaining trading elements (typically buyers, consumers) in a trade and the sum of the TVs of all trading partners who charge for providing trading elements (typically sellers, providers) in a trade. Facilitators typically behave like sellers by charging a price.

DETAILED DESCRIPTION

The present invention relates to an improvement in electronic commerce. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The invention enables a multi-party trading scenario. A multi-party trading system is identified as one in which there are multiple trading partners each belonging to a service category and providing or consuming one or more trading elements of that or of other service categories. The trade involves multiple trading elements where each element is valued in different dimensions of attributes.

Example: a trade involving a customer planning a trip between San Francisco and New York includes trading elements of an airline ticket, rental car, and hotel stay. This identifies service categories like airline, car, hotel. Trading partners like United Airlines and Delta Airlines belong to the airline category. Hertz and Avis belong to the car rental category; and Holiday Inn and Four Seasons belong to the hotel category. There could be additional service categories like shipping (for mailing the reservation package to the customer) and this can involve companies such as Federal Express or the United States Postal Service.

The trading elements can be valued using multiple attributes. A related application "Attribute Tree for Modeling Value of Multi-Attribute Products/Services for an Online Trading System", filed May 24, 2000, Ser. No. 09/578,192, describes attribute trees for valuing products with multiple attributes. For instance, an airline ticket can be thought of as having a number of attributes like day-of-departure, day-of-arrival, time-of-departure, time-of-arrival, class-of-service, etc. Attributes have values and ranges. Time-of-departure has possible values of different times of the day. Ranges help group values at equal intervals. For instance, the time-of departure attribute for an airline that flies every hour of the day except between 1 pm and 4 pm and 2 am and 4 am can be described using two ranges: 5 pm–1 am and 5 am–12 pm.

Attributes and attribute values may be statically decided by the trading partners, or dynamically decided by the trading partners at the time of the trade. The trading partners identify attributes through a common ontology of attribute names and representation of attribute values and mechanisms to convert between value types. Trading partners attach different True Values to different attribute values. For one customer, customer A, a flight leaving in the morning is of higher value than the one leaving at night while for another customer, customer B, the opposite may be applicable. The airline may value flights in the morning and evening in different ways based on other parameters. This invention helps the airline sell tickets to both customers A and B and satisfy them and still maximize the airline's True Value.

Expressing True Values (TV)

The invention allows trading partners to define True Value in terms of attributes of the trading elements. The True Value may be identified using a baseline value for each trading element and a differential or delta for each of the attribute values for these trading elements.

For instance, a customer may provide a baseline value (price) of $500 for a ticket from San Francisco to New York. For a flight leaving in the morning the customer may specify a differential or delta of +40$ indicating that a morning flight is of higher value to the customer. For a flight leaving in the evening the customer may specify a differential or delta of −50$ indicating that an evening flight is of less value to the customer. This is called the Explicit TV method.

Alternatively, the TV may be stated as a price at which the trading partner values each valid combination of attribute values describing the trading elements. For instance, the customer may specify the value of a morning flight from San Francisco to New York at $460 and the evening flight at $550. This is called the Implicit TV method.

The invention allows the trading partners to keep the information about their True Values confidential from other trading partners. The system allows each trading partner to selectively disclose True Value information to selected trading partners to allow for cooperative and coordinated pricing strategies. The system also allows trading partners to selectively adjust their True Values if they find a particular trading partner or set of trading partners participating in the same trade with them.

Trading Protocol and Creating Net Value (NV)

Using the True Values specified by each trading partner in the trade the system identifies attributes and attribute values for each trading element that maximizes the Net Value (NV) for the trade. The NV is the difference between the sum of the True Values of the buyer, (consumers) and the sum of the True Values of the seller (providers). The system then distributes the NV back to each trading partner. In general, the system allows a trading partner to participate in a trade at a price equal to or better than their True Value. If a trade does not get settled, the system communicates to each trading partner the true-value that would have closed the deal for them and allows each trading partner to adjust their True Value based on this.

The net value is the difference between the true values for the buyer and for seller in a 2-party trade. In multi-party trades, the net value is difference between the sum of the true values submitted by all of the buyers and the sum of the true values submitted by all of the sellers in the trade.

FIG. 1A is a diagram showing true values placed on a product by the buyer and by the seller in a simplified 2-party trade. The difference in the true values of the buyer and seller is the net value created by the trading system. This net value is divided among the buyer, seller, and the trading exchange. Thus the buyer buys at a price lower than his true value, while the seller sells at a price above his true value.

In a multi-party trade, the buyer's TV is replaced with the sum of all the TV's for all the buyers. The seller's TV is likewise replaced with the sum of all the seller's TV's. The buyers can have differing TV's, as can the sellers.

Revenue Model

The price at which each trading element is settled in a trade is specific to that trading element. The invention creates value by identifying trading partners that value trading elements differently. The invention then distributes this value created back to the trading partners, thus allowing each trading partner to get the trading element at a price that is equal to or superior than the value that they ascribe to that trading element. For a buyer, a superior price is one that is less than the value they ascribe to the trading element while for a seller, a superior price is one that is more than the value they ascribe to the trading element. If the trade cannot be settled, then the system tells the trading partner what their value should have been had they wanted to settle the trade at that point. This feedback information loop allows the trading partners to adjust their value over time. The revenue model benefits the trading partners and the exchange.

The trading partners benefit because they get to participate at a price equal to or better than their True Values. They also may get to participate in the decision of how the value created is divided amongst themselves and can decide how much of it goes to the exchange.

The exchanges get compensated based upon the value they "create" for their trading partners. This discourages trading partners from closing the deals outside the system. It builds customer loyalty and repeat business for the exchanges. This also encourages exchanges to behave in a manner that they create overall value rather than charge for just hosting the trade.

In general, the invention has the advantage that it rewards trading partners for right behavior and high performance. At the same time it does allow a-priori negotiation of value distribution.

Architecture

Figure 1B:
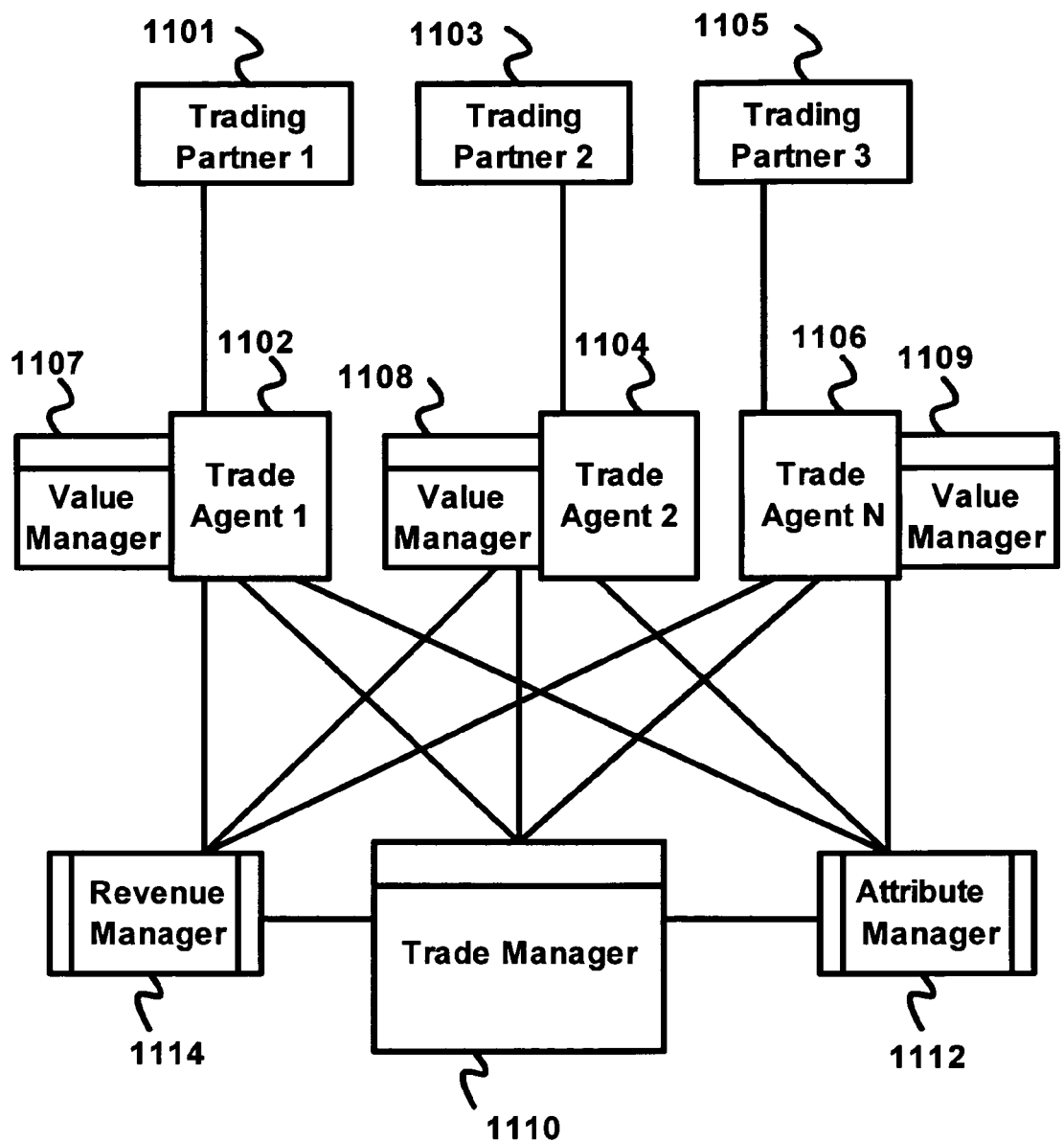
FIG. 1B shows components of the multi-party trading system.

FIG. 1B shows components of the multi-party trading system. Trading-Partner Agents or Trade Agents (TA) 1102, 1104, 1106 correspond to each Trading Partner (TP) 1101, 1103, 1105. Trade Agent 1102, 1104, 1106 represent Trading Partner 1101, 1103, 1105 respectively in the electronic exchange.

Each Trade Agent is aware of the True Value that its Trading Partner ascribes to a given trading element and uses this information to make decisions about participating in a deal. Each Trade Agent keeps this information about the True Values confidential from the exchange and from all other trading partners and only discloses this information to selected trading partners if authorized to do so by the Trading Partner.

Value Manager (VM) 1107, 1108, 1109 manages True Values for the trading partners. In one embodiment the VM lives inside each Trade Agent and helps each Trade Agent manage the True Values and respond to the exchange and other trading partners. In another embodiment, the Value Manager lives inside the exchange itself and helps the different trading partners speak the same language and understand each other. This is called the Attribute Manager (AM) 1112. Attribute manager 1112 keeps track of all the attributes supported within the trading system and is aware for each attribute what the attribute type is, the possible values and ranges. Attribute manager 1112 also knows which trading partner supports which attributes.

True Values are expressed using attributes and dependencies between attributes. The Value Manager has mechanisms for storing, retrieving, and updating attributes, working with attribute values and ranges, and converting between attribute names, types, values, and ranges.

Trade Manager (TM) 1110 is in charge of conducting trades at the exchange. Trade Manager 1110 identifies the potential trading partners for a given trade and identifies the trading protocol that will be used among the trading partners to communicate their True Values and for the system to compute the Net Value.

Revenue Manager (RM) 1114 computes the revenue for each trading partner and for the exchange itself.

Figure 2:
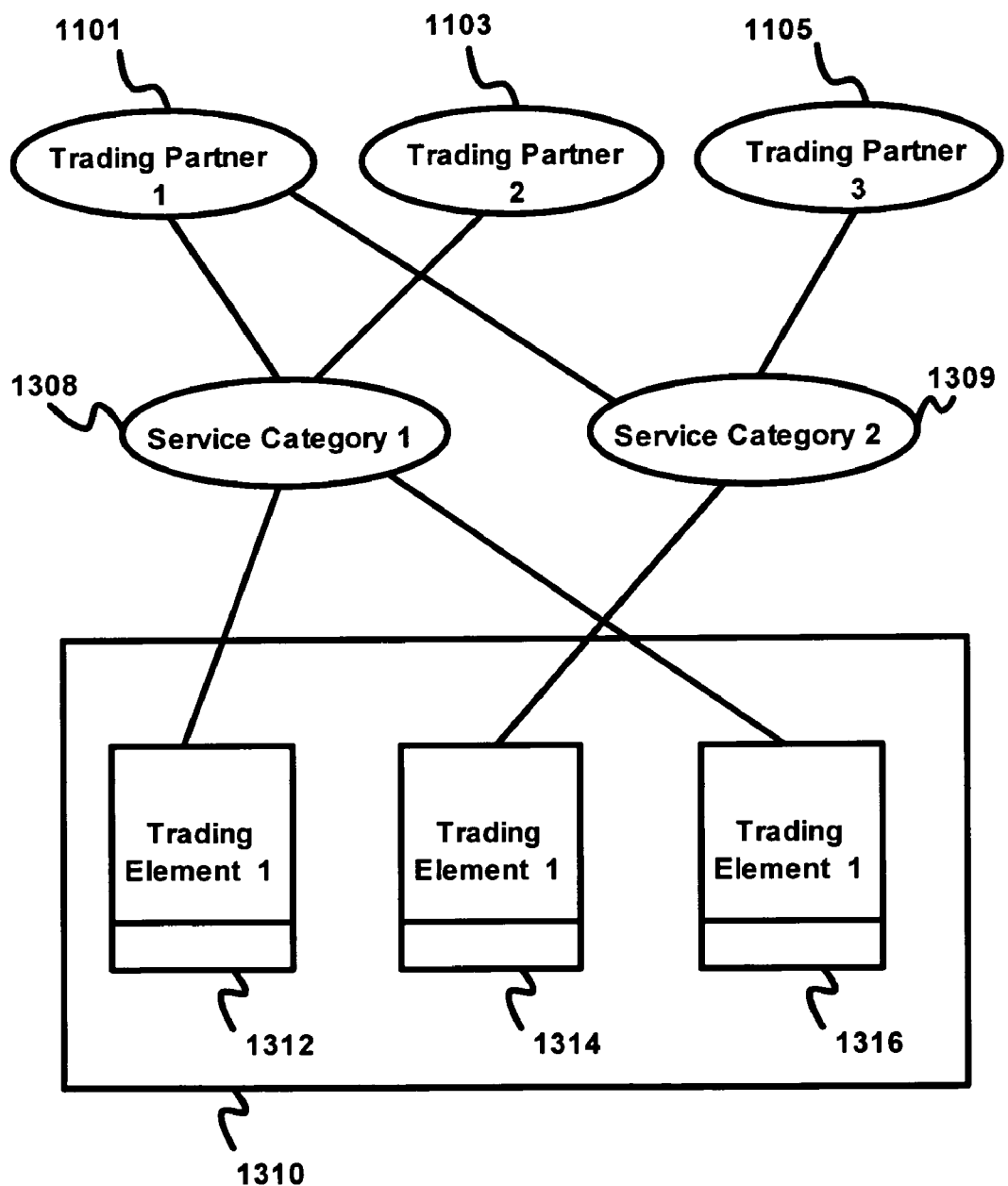
FIG. 2 shows a Trade object with its trading elements.

FIG. 2 shows a Trade object with its trading elements. Trade 1310 has trading elements 1312, 1314, 1316. Each of these trading elements belong to one of service category 1308, 1309. Each service category 1308, 1309 can be represented in zero or more trading elements. Each trading partner 1101, 1103, 1105 supports one or more service categories 1308, 1309.

Theory of Operation

Let the attributes be represented by the set $A = \{A_1, A_2, \ldots, A_n\}$.

Let $A_i$, $i=1, \ldots n$ have values $\{v_{i,1}, v_{i,2}, \ldots v_{i,m}\}$.

Let the Trade Agents in the exchange be represented by $TA_1, TA_2, \ldots TA_q$.

A set of attribute values associated with an offer ok may be specified using a vector $v_k = (v_{1,k1}, V_{1,k2}, \ldots v_{1,km})$.

The offer itself for a trading partner TAP may be represented by $(V_k, D_{k,p})$ where $D_{k,p}$ is the True Value that the trading partner associates with the trading element with the attribute values in $v_k$.

The goal of the Trade Manager is to identify an offer from all the submitted offers, the one offer that maximizes value. This offer, $O_d$ called the Deal has the maximum value of the Sum($D_{k,p}$)–Sum($D_{k,q}$) where TAp's are Consumers (buyers) and TAq's are providers (sellers).

Operation of Invention

Figure 3:
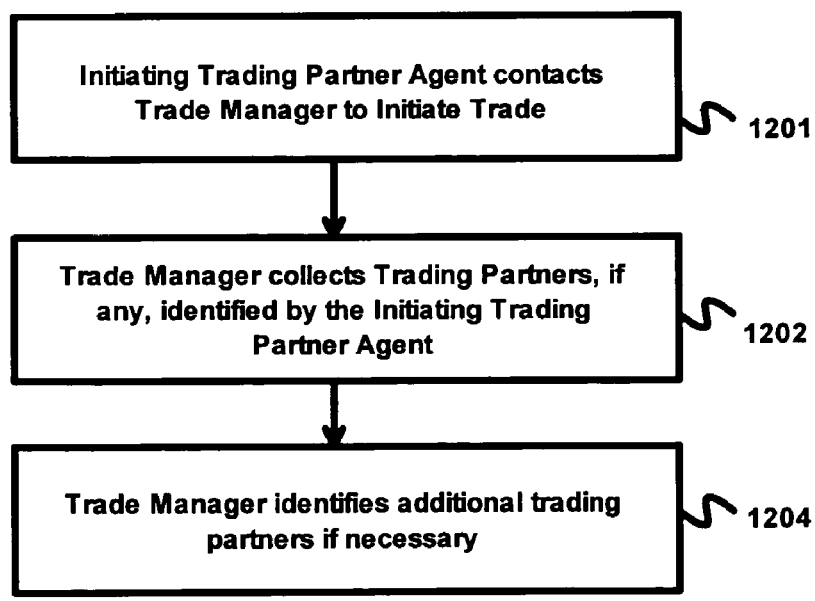
FIG. 3 shows initiation of a trade.
Figure 4:
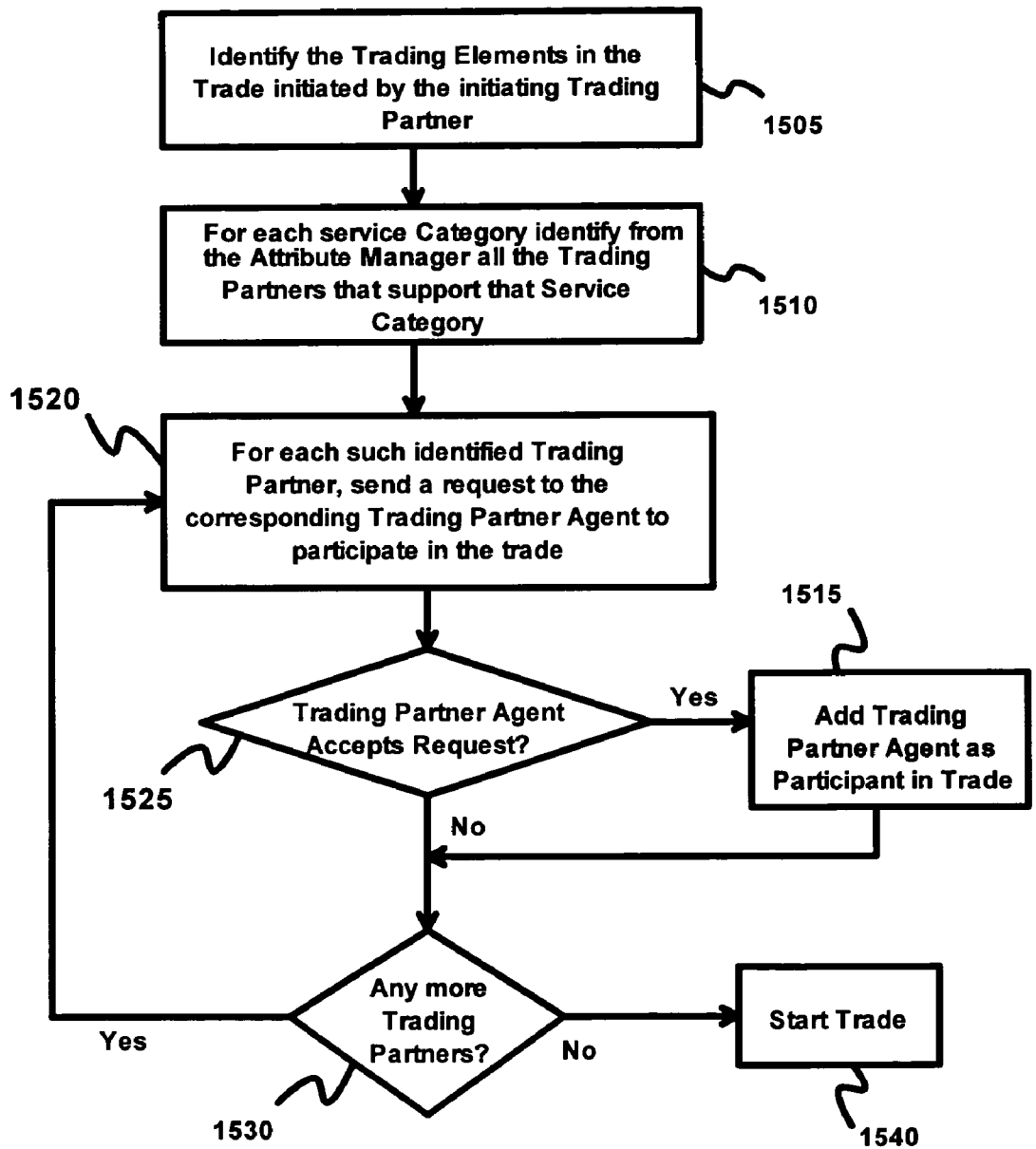
FIG. 4 shows a preferred embodiment for identifying the set of trading partners that may participate in the trade.
Figure 5:
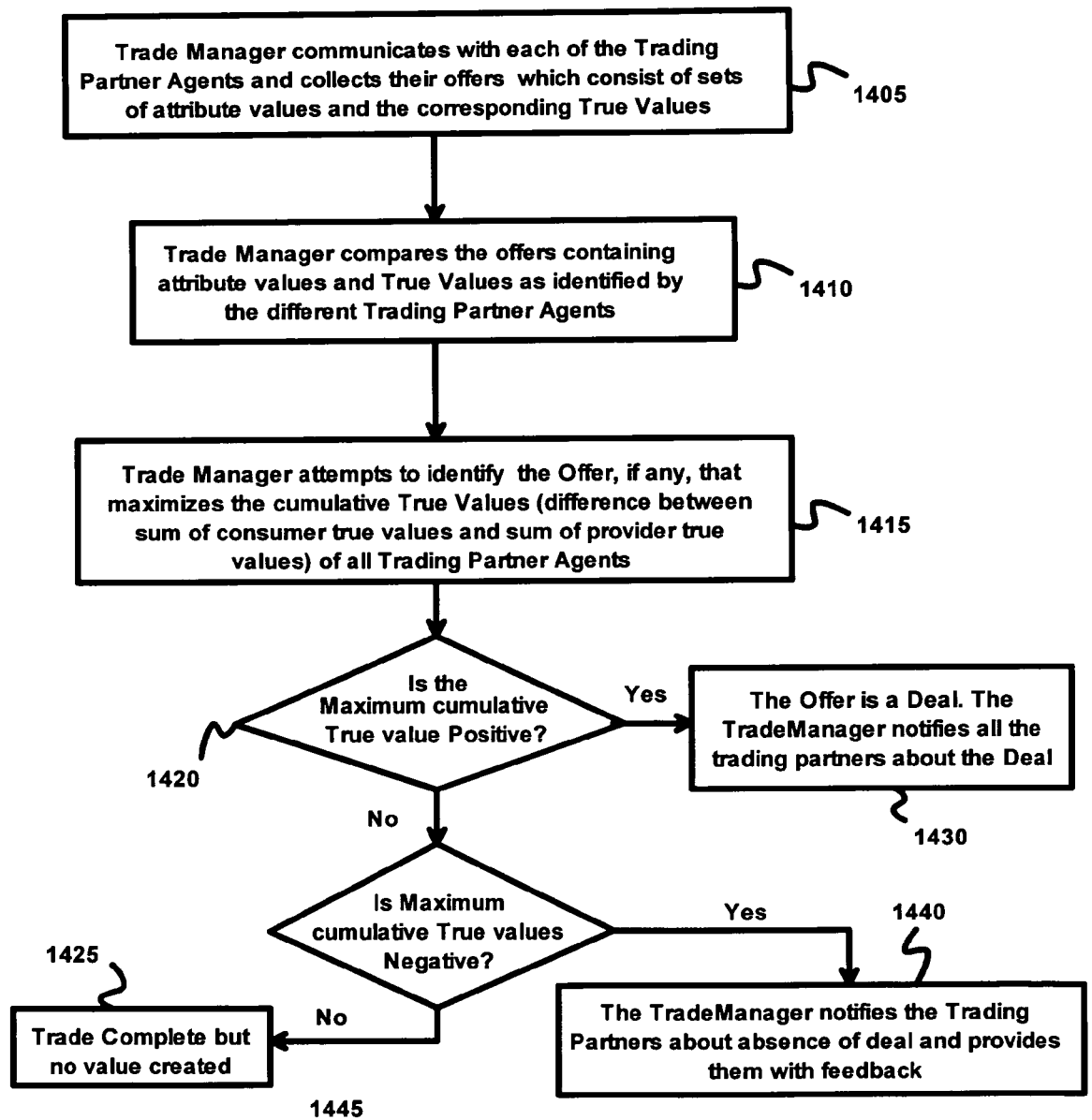
FIG. 5 shows a preferred embodiment of computing net value in a trade.

This invention embodies the operation of the trading protocol to create Net Value. FIGS. 3, 4, and 5 show an embodiment of a Value-Creating Trade.

Trade Initiation and Trade Agent Identification—FIG. 3

FIG. 3 shows initiation of a trade. A trade is initiated in block 1201 by one or more than one of the Trade Agents by contacting the Trade Manager and sending the list of trading elements and their attributes that is of interest to that trading partner. The trading partner's agent that initiates the trade is known as the Initiating Trading Partner Agent, and it may initiate a trade as a buyer or a seller or a facilitator.

The other participants in the trade are identified in blocks 1202, 1204. The other trading partners may be identified by the Initiating Trading Partner Agent, block 1202, or by the trade manager, block 1204.

Identifying Trading Partners for a Trade—FIG. 4

FIG. 4 shows a preferred embodiment for identifying the set of trading partners that may participate in the trade. The Trading Partners 1101, 1003, 1105 (FIG. 1) may be identified by the Trade Manager 1110 based on the identity of the Initiating Trading Partner and the trading elements and attributes that it specifies, as in block 1505. The Trade Manager may query the Attribute Manager 1112 (FIG. 1) to identify trading partners that support the trading elements and the attributes that are of interest to the Initiating Trading Partner, as in block 1510.

In addition, there may be a negotiation between the Trade Manager 1110 and the Trade Agents 1102, 1104, 1106 of the identified trading partners 1101, 1103, 1105 and the Initiating Trading Partners about their willingness to participate in the trade as in block 1520, 1525, 1530. In a complex scenario, this negotiation might introduce additional trading elements or additional attributes or modify existing attributes or remove attributes that are of importance to the trade. The qualifying Trade Agents are added as participants of the trade in block 1515. The trade is then started as in block 1540.

In an alternative embodiment, the other trading partners may be explicitly identified by the Initiating Trading Partner. This embodiment provides for a faster and more efficient outcome from the perspective of system performance but results in a less efficient system for all trading partners since they have limited to no information a priori about the True Values of other trading partners. Thus a less-than-optimal system of picking trading partners results.

Preferred Embodiment for Computing Net Value—FIG. 5

Once the participating Trade Agents are identified the Trade Manager's goal is to identify the combination of attributes for all the trading elements that create the greatest overall Net Value. Trade Manager 1110 also identifies the best set of trading partners that can create this Net Value. FIG. 5 shows a preferred embodiment of computing net value in a trade.

The Trade Manager 1110, in block 1405, requests each Trade Agent 1102, 1104, 1106 for a set of attribute value selections and associated True Value that the trading partner associates with each selection. This may be an exhaustive collection or a subset heuristically pruned by the Trade Agent. Each member of this set represents a potential trading element and a price that the TA is willing to trade on for that trading element. Each member of this set is called an Offer.

Trade Manager 1110 then identifies, in block 1410, overlaps in the attribute value selection sets across Trade Agents 1102, 1104, 1106. Note that it is possible that a Trade Agent 1102, 1104, 1106 may not support, or may not specify a True Value, for an attribute value set selection for which another Trade Agent expresses a True Value. For instance, though a customer may wish to fly on a Friday, a particular airline may not fly on that day. Such sets may be dropped. Notice that a True Value expressed by a Trade Agent is not known to any other Trade Agent and that this value is not used by any other Trade Agent in making a decision on the exchange.

The Trade Manager then identifies, in block 1415, the offer that maximizes the cumulative True Value. For each of the offers, the Trade Manager computes the cumulative True Value as follows. The cumulative True Value for an offer is the difference between the sum of the True Values of the consumers or buyers and the sum of the True Values of the providers or sellers and the facilitators for the trading elements in that trade.

The offer with the maximum cumulative True Value identifies the Net Value of the trade.

Three cases arise as checked for in decision boxes 1420 and 1425:

1. If the Net Value is positive, block 1430, the trade manager identifies the greatest value created by the system in this trade. This offer that identifies the NV is called a Deal.
2. If the Net Value is zero, block 1445, no value is created. However, the providers, consumers, and facilitators are effectively matched by the system.
3. If the Net Value is negative, block 1440, it could mean that some of the trading partners have so poorly identified their True Values that trade cannot satisfactorily take place. Alternatively, it could mean that the providers and the consumers all consider the attribute values to be so highly valuable or not valuable at all that the system cannot identify and bring together trading partners with such divergent True Values. In this case, the system will provide each trading partner with a price at which it could have settled the trade. Each trading partner can use this information to adjust its True Value going forward.

Alternate Embodiment for Computing Net Value

The True Values can be expressed using the Explicit TV method where the Trade Agent 1102, 1104, 1106 specifies a baseline value for each trading element and a positive or negative delta for each of the attribute values for each of these trading elements. An alternative embodiment for computing Net Value is given below.

1. Each trading partner identifies a baseline value for the trade.
2. For each attribute value combination that a Trade Agent 1102, 1104, 1106 cares about (that pertains to its service category) the Trade Agent 1102, 1104, 1106 provides a delta value. A positive delta value means that the Trade Agent values this combination more than the baseline and a negative value means that the Trade Agent 1102, 1104, 1106 values this combination less. The True Value is the sum of the baseline and the delta.
3. The Trade Manager 1110 accumulates all the Trade Values for all the attribute value sets as in the preferred embodiment and finds the one which returns the best overall cumulative True Value.

For both Explicit and Implicit TV methods, the TAs could optionally identify a maximum or minimum price (maximum for consumers and minimum for providers) above or below which they would not trade for certain attribute value selection sets. Identifying such combinations early enough helps the Trade Manager 1110 eliminate offers early on so as to optimize the computation of the cumulative values and the final Net Value.

Revenue Based on Value Created, not Price

Revenue is computed as a function of the value created by the trading system.

In a traditional revenue model the trading system or any intermediary that enables the trading partners to trade takes a commission as a percentage of the actual transaction cost. Thus the system makes revenue whether or not the trade was a good deal for the trading partners.

In this invention, revenue is computed as a function of the sum of value created for all the trading partners participating in the trade. The value that is created is distributed among all the trading partners and the exchange. In one embodiment this percentage can be pre-negotiated. In another embodiment this percentage can be dynamically negotiated and decided during the transaction.

Computing Revenue

Figure 6:
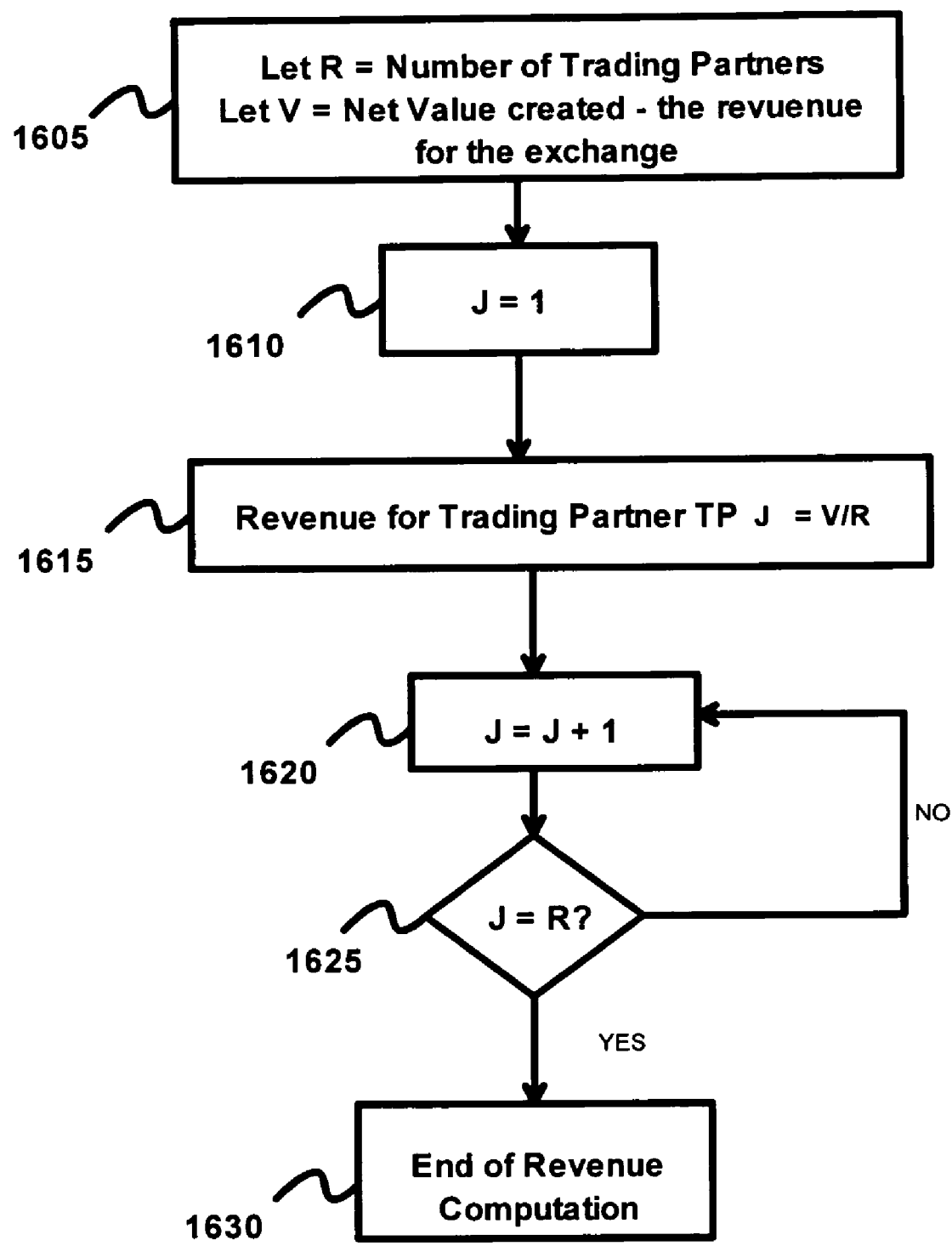
FIG. 6 shows equally dividing the net value created among all trading partners.

FIG. 6 shows equally dividing the net value created among all trading partners. In this embodiment all trading partners are treated equally, and the Net Value created is equally distributed among all the trading partners after the revenue to the exchange. Step 1605 sets the count for the total number R of Trade Agents 1102, 1104, 1106. V is initialized in step 1605 to the remainder after the exchange has taken its revenue from the Net Value. The net value is the difference between the true values of the buyer and seller in a 2-party trade, or buyers and sellers in multi-party trades.

In the loop ranging from 1 to R in blocks 1610, 1615, 1620, 1625, 1630, the revenue for each trading partner is computed as the ratio of V and R in 1615. Block 1630 indicates the end of revenue computation.

Figure 7:
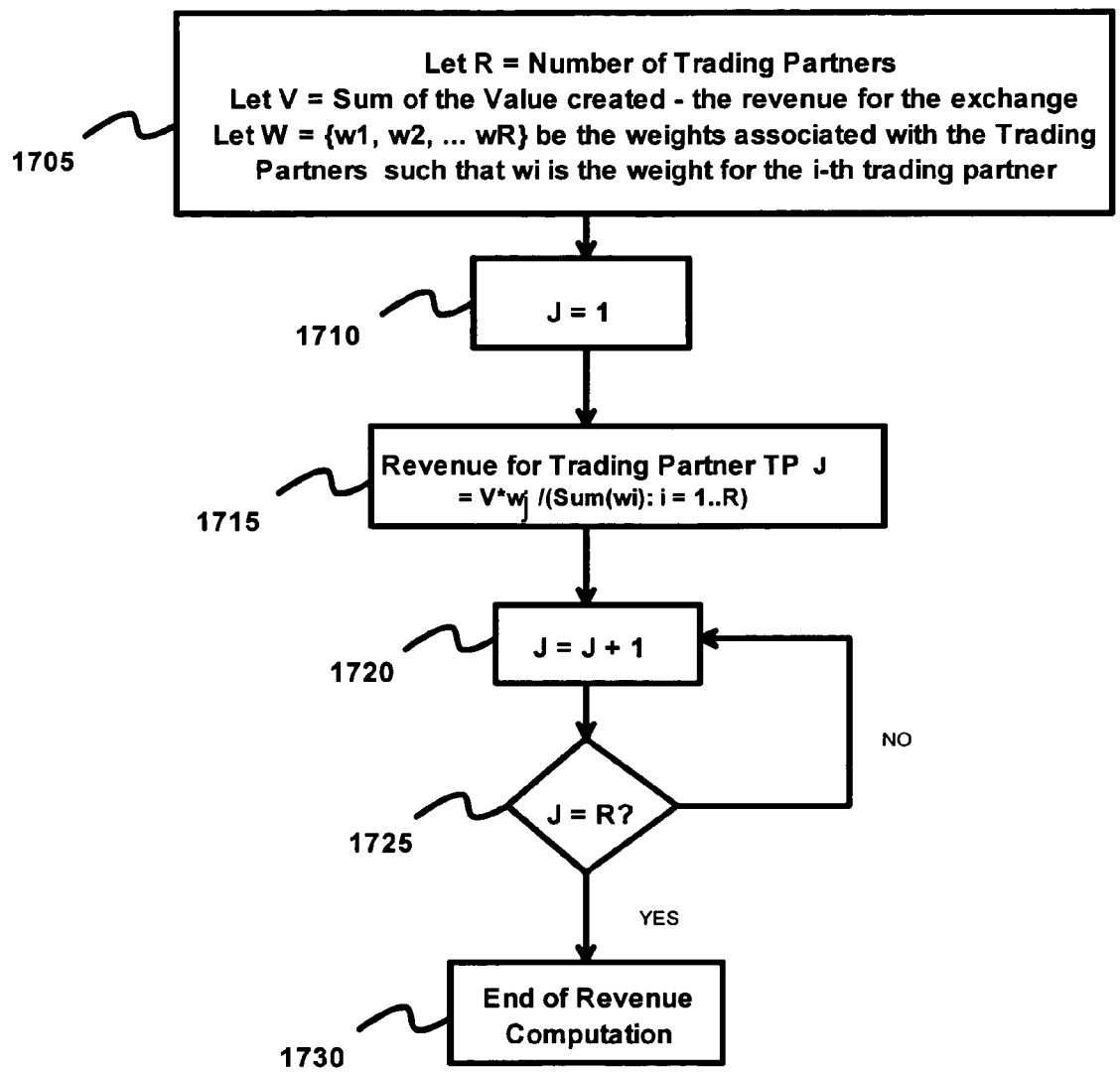
FIG. 7 shows dividing the net value created among trading partners using weightings.

FIG. 7 shows dividing the net value created among trading partners using weightings. In this embodiment, Trade Agents 1102, 1104, 1106 are ordered by importance (in a pre-negotiated way) and the Net Value is distributed in a weighted manner among the trading partner agents and the exchange. Let w1, w2, ... wn be the weights associated with trading partner agents as in block 1705. Also, V is initialized in block 1705 to the remainder of the created value (difference in true values) after the exchange has taken its revenue from the Net Value. In the loop ranging from 1 to R in blocks 1710, 1715, 1720, 1725 the revenue for the J-th trading partner is computed as the product of V and the ratio of the weight for the J-th trading partner over the sum of all the weights from all trading partners.

In another embodiment, which is a hybrid model, the exchange charges a revenue which can be a measure of a percentage of the amount involved in the trade or the complexity of the trade computation.

In yet another embodiment, revenue can be participation-frequency based where Trade Agents 1102, 1104, 1106 more-frequently participating in trades are given back better percentages of the Net Value.

Figure 8:
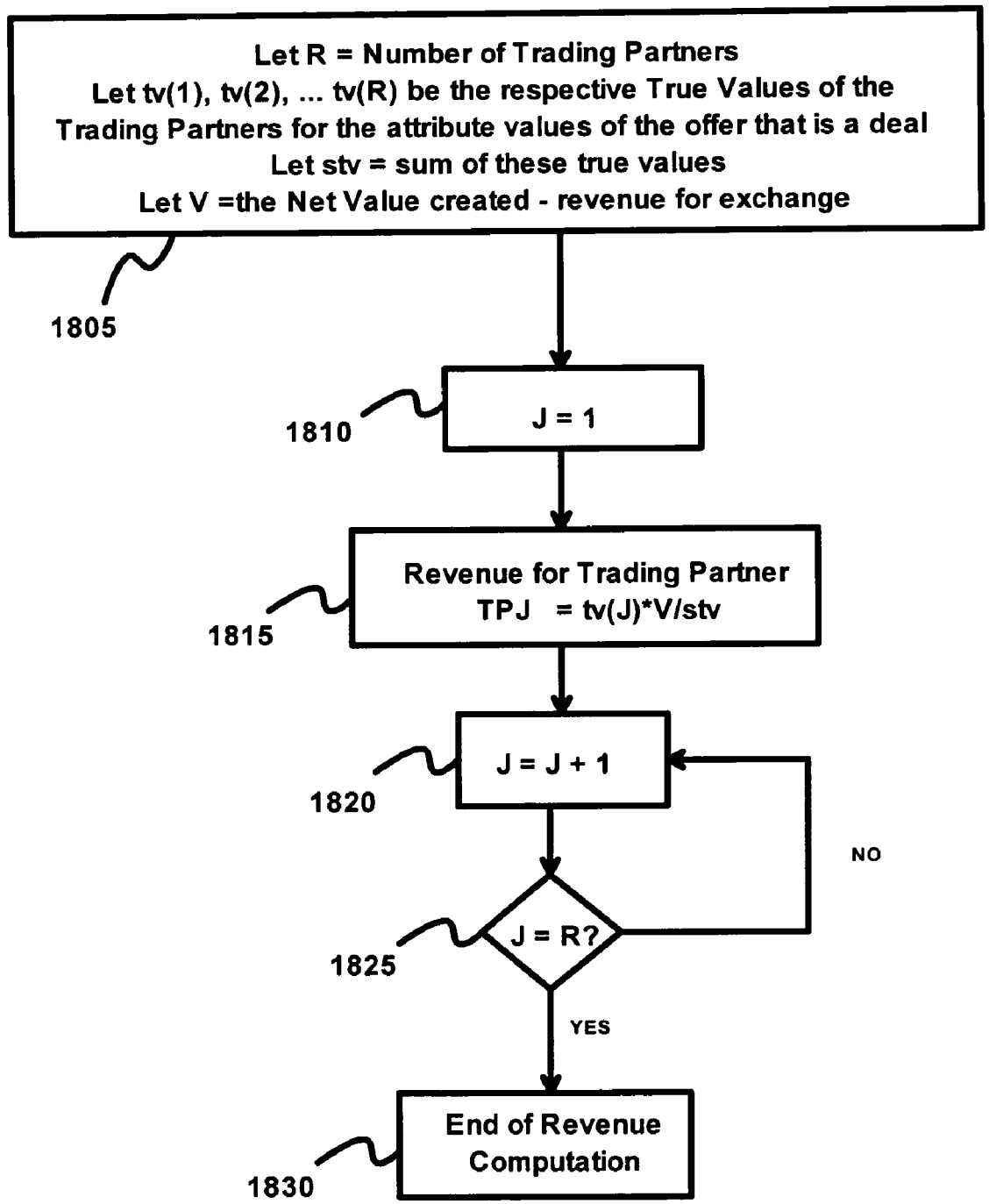
FIG. 8 shows distributing the net value created based upon the contribution to value creation by each trading partner.

FIG. 8 shows distributing the net value created based upon the contribution to value creation by each trading partner. In this embodiment the amount returned to each Trading Partner Agent is computed as a function of their contribution towards maximizing the Net Value of the trade. The higher the True Value of a trading partner (the consumer is willing to pay more or the provider is willing to charge less), the higher is the percentage of the Net Value returned to that trading partner.

The remainder V is distributed in weighted or in uniform parts as value back to each trading partner. Block 1805 computes V and computes the sum of the True Values (STV) for each of the trading partner agents for the final deal. In the loop spanning over blocks 1810, 1815, 1820, 1825 revenue for each trading partner agent participating in the trade is computed. In block 1815 the revenue for trading partner TP-J is computed as the product of its true value and the ratio of V and the sum of the True Values, or V*(TVj/STV). In other words, the Net Value is distributed among the trading partners in a ratio proportional to their respective revenue contributions to the deal. The Net Value is equally distributed on a percentage benefit basis to all trading partners and the exchange itself.

Advantages of the Invention

Accordingly, the invention can be used to create value in an electronic trading system with the following advantageous features:

1. A Trade is represented as a complex object of trading elements.
2. Trading partners define their true value of different trading elements based upon their attributes.
3. True values defined by the trading partners are kept confidential and not revealed to other trading partners without mutual agreement between the trading partners.
4. A trade is settled in such a way that the trading partners participate at a price at least as good as the value they attach to the different trading elements, their true value.
5. Value is created by identifying trading partners that value trading elements differently to participate together in the trade.
6. A revenue model is based on value creation. The value created is distributed back to the trading partners.
7. When a trade is not settled, feedback is provided to the trading partners as to what their value should have been to settle the trade in such a way that it creates value for them.

Those skilled in the art may notice that the Trade Agent 1102, 1104, 1106 does not have any incentive to misrepresent or state a True Value that is not its rational True Value. By doing so, the Trade Agent will either not get a trade settlement at all, or if it does get a trade settlement, it will end up with an inferior result than what it could get by representing its rational True Value accurately.

For instance, a customer who values a ticket from SFO to NYC randomly at $200 when all airlines are selling above that amount and all other customers are valuing it above that price will never be able to obtain a ticket as there are other customers who are willing to buy it at a higher price. If the customer randomly values the ticket at $400 when all airlines are selling below that amount and all other customers are valuing it below that price, the customer will get the ticket but the difference between $400 and his True Value will now also be a part of the Net Value and may get partially distributed to the other trading partners. Thus the customer will end up with an inferior result if he randomly understates or overstates his True Value for a given attribute selection. Of course, it is possible that a misinformed or uninformed customer truly values such a ticket at 200$ and loses out. The system can provide feedback to the customer of the deal this customer lost and the customer can use this feedback for future trade participation.

Even when there is no net value created the customer still gets an opportunity to buy a product based upon the attribute and attribute values he/she cares about the most.

Alternate Embodiments

Several other embodiments are contemplated by the inventors. It is possible that the Exchange itself is a trading partner and is participating in the trade.

In one embodiment, the system may be implemented as a neutral exchange where the trade manager and the electronic exchange are not biased towards any trading partner. In another embodiment, the system may be implemented as a preferential or biased exchange where the exchange is partial or biased towards to one or more trading partners.

In another embodiment, the confidentiality of the value that a trading partner associates with an offer may be partially or wholly compromised. The level of this confidentiality may be identified by a trading partner or through negotiations between the trading partners. For instance, an airline and a car rental company could share information about their logic of attaching values to certain attributes to be mutually beneficial to each other.

In another embodiment, a trading partner may associate with each offer a value that is dependent on which other trading partner is involved. For instance, for a consumer interested in buying a vacation package, a particular airline, say United Airlines, may offer a 20% discount when a car is rented from Avis Car Rental Company. A trading partner can use this information to provide product bundling or other promotions based on the presence or absence of other trading partners.

In another embodiment of the system, the Trade Manager 1110 may perform optimizations in requesting offers from the Trade Agents 1102, 1104, 1106 by grouping them into smaller groups of sub-trades. Further, the Trade Agents 1102, 1104, 1106 may identify certain offers as static across such sub-trades and certain others as dynamic depending on the sub-trade and the Trade Agents 1102, 1104, 1106 in the sub-trade. The Trade Manager may cache or keep a local copy of the offers that are static.

In another embodiment, Offers may be static even across trades. For instance, an airline may cache the most-frequently-requested prices for certain popular routes on certain days with the Trade Manager 1110. These may be used across trades involving different customers. Such caching has the advantage that for repeated requests for offers the airline system does not have to make expensive accesses to its back-end store.

The present invention can be used in a business-to-consumer (B2C) scenario involving one business (seller) and another consumer (buyer). The invention can also be used in a business-to-business (B2B) scenario involving two businesses where one business is a seller and another business is a buyer. It can also be used in an auction scenario—one seller and multiple buyers (forward auction) or multiple sellers and one buyer (reverse auction). The invention can be applied to a trade scenario with multiple buyers and sellers (an exchange).

Price is generally used as the currency measure for value. In an alternative embodiment of this invention, no currency may be exchanged and just goods and services may be exchanged (barter). In general, value created can be described in terms of some utility function defined to be common for all buyers.

Buyers could be participating in (buying) different trading elements of the trade. Similarly, sellers could be participating in different trading elements. Buyers do not have to buy at the same price since they might be buying different components of the augmented product. Also since the preferences could be different the attribute values could be different for different buyers and sellers. For instance, in the same trade which involves selling 5 tickets to 5 different passengers one could be a first class ticket, one could have a window seat etc. etc. and they all could sell at different prices.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A multi-party trading system comprising:
   one or more trading agents computer, coupled to one or more trading partners computer that provide or consume trading elements, for representing the trading partners in an electronic exchange;
   one or more value managers computer, coupled to said one or more trading agents computer, each for storing and managing true values, the true values being defined by a trading partner to represent value of the trading elements as perceived by the trading partner;
   one or more trade manager computer, coupled to said one or more trading agents computer and receiving the true values from the value managers, for conducting trades at the electronic exchange, the trade manager receiving buyer true values from the trading agents representing buyers that consume one of the trading elements and seller true values from the trading agents representing sellers that provide the trading element, the trade manager generating a net value as a difference of the buyer true values and the seller true values; and
   one or more revenue manager, coupled to said one or more trade manager computer to receive the net value, for allocating the net value among the trading partners representing the buyers and the sellers,
   whereby the net value is allocated among buyers and sellers.

2. The multi-party trading system of claim 1 wherein the buyer pays less than the buyer true value for the trading element;
   wherein the seller receives more than the seller true value for the trading element, whereby the buyer and seller trade at better prices than their true values when a trade is conducted by the electronic exchange.

3. The multi-party trading system of claim 1 wherein the revenue manager allocates:
   a first portion of the net value to one of the trading partners representing a seller of the trading element, a second portion of the net value to one of the trading partners representing a buyer of the trading element,
whereby the net value is allocated to both the buyer and the seller.

4. The multi-party trading system of claim 3 wherein the first portion and the second portion are equal,
whereby the buyer and seller equally share portions of the net value.

5. The multi-party trading system of claim 3 wherein the revenue manager also allocates a third portion of the net value to the electronic exchange,
whereby the electronic exchange receives the third portion of the net value, the net value being the difference between the seller true values and the buyer true values for the trading element.

6. The multi-party trading system of claim 3 wherein the seller true values vary with attributes of the trading elements, the value managers providing a plurality of true values for one of the trading elements that is modified by several of the attributes,
whereby the value managers adjust the seller true values to account for attributes that modify the trading element.

7. The multi-party trading system of claim 6 wherein the trade manager selects the attributes and attribute values of the attributes for one of the trading elements to maximize a net value, the net value being a difference of buyer true values received from the trading agents representing buyers and seller true values received from the trading agents representing sellers of the trading element,
whereby the trade manager maximizes net value when selecting the attributes of the trading element.

8. The multi-party trading system of claim 6 wherein the value managers store a base value for one of the trading elements and delta values that adjust the base value when the trading element is modified by the attributes,
whereby multiple values are stored for the trading element modified by the attributes.

9. The multi-party trading system of claim 6 wherein a trade includes multiple trading elements, multiple trading agents representing multiple buyers and multiple sellers,
wherein the trade manager generates the net value for each of the multiple trading elements,
whereby multiple-aspect trades are managed.

10. The multi-party trading system of claim 3 wherein the trade manager identifies a trading protocol, the trade manager informing the trading agents of the trading protocol.

11. The multi-party trading system of claim 3 wherein the trade manager selects participating trading agents from the trading agents, the participating trading agents providing or consuming one of the trading elements, the participating elements sending true values of the trading element to the trade manager,
whereby the trade manager selects the participating trading agents for a trade.

12. A computer-implemented method for conducting a trade comprising:
receiving offers over an electronic medium from trade agents executing on one or more computers for a trading element to be exchanged in the trade, the trade agents representing trading partners in the trade;
for each offer received over the electronic medium from a trade agent, receiving a plurality of true values over the electronic medium, the plurality of true values representing differing valuations the trading partner places on the trading element when modified by attributes;
comparing using software executing on a computer the offers received over the electronic medium for the trading element by comparing the true values for a plurality of combinations of the attributes;
selecting a maximum combination of the attributes using software executing on the computer, the maximum combination being a combination of the attributes that maximizes a cumulative net value, the cumulative net value being a difference between a buyer-sum of the true values from trade agents for buyers and a seller-sum of the true values from trade agents for sellers for the trading element modified by a combination of the attributes;
transacting the trade for the trading element modified by the maximum combination of elements,
whereby the cumulative net value is maximized when selecting attributes of the trading element being traded.

13. The computer-implemented method of claim 12 further comprising:
notifying the trade agents over the electronic medium of the combination of attributes of the trading element selected,
whereby the attributes selected for the trade are reported to the trade agents of the buyers and of the sellers.

14. The computer-implemented method of claim 12 wherein the attributes are associated with attribute values, the attribute values defining a configuration of an attribute of the trading element;
further comprising:
receiving over the electronic medium the attribute values from the trade agents with the offer,
whereby the attribute values are submitted with the offers.

15. The computer-implemented method of claim 12 wherein transacting the trade is performed when the cumulative net value is non-negative;
when the cumulative net value is negative, notifying the trade agents over the electronic medium that submitted the offers that no deal could be transacted,
whereby the trade agents are notified when no deal is made.

16. The computer-implemented method of claim 15 wherein the trade agents are notified over the electronic medium of the true values that a deal could be transacted at when the cumulative net value is negative,
whereby feedback of the true values is provided when no deal is made.

17. The computer-implemented method of claim 12 wherein when the cumulative net value is positive, the method further comprising:
allocating the cumulative net value among the buyers and sellers and an exchange that conducts the trade,
whereby the cumulative net value is allocated among trading partners and the exchange.

18. The computer-implemented method of claim 12 further comprising:
allocating a remainder of the cumulative net value after an allocation to the exchange by dividing the remainder equally among all buyers and sellers participating in a trade,
whereby the remainder of the cumulative net value is divided equally.

19. The computer-implemented method of claim 12 further comprising:
allocating a remainder of the cumulative net value after an exchange allocation by dividing the remainder in proportion to weightings among the buyers and sellers participating in a trade whereby the remainder of the cumulative net value is divided according to the weightings.

20. The computer-implemented method of claim 12 further comprising:
allocating a remainder of the cumulative net value after an exchange allocation by dividing the remainder among the buyers and sellers participating in a trade in relation to an amount of value created by the buyer or seller,
whereby the remainder of the cumulative net value is divided according to contribution to value.

21. The computer-implemented method of claim 20 further comprising:
determining a first sum of the true values of the trading partners participating in the trade;
multiplying the cumulative net value by the true value of one of the trading partners and dividing by the first sum to generate a weighting for the trading partner; and
using the weighting to allocate a portion of the remainder to the trading partner, whereby the remainder is allocated based on value-creating weightings.

22. The computer-implemented method of claim 12 wherein the trading element is a product or a service.

23. The computer-implemented method of claim 12 further comprising:
identifying a service category associated with the trading element;
identifying possible trading partners in the service category;
sending a request to the trade agents for each of the possible trading partners in the service category;
adding a possible trading partner to the trade when the possible trading partner accepts the request, whereby other possible trading partners are invited to participate in the trade.

24. The computer-implemented method of claim 12 further comprising:
receiving a list of trading partners from an initiating trading partner that initiates the trade,
whereby the trade is initiated by the initiating trading partner who specifies other trading partners.

25. A computer-program product comprising:
a computer-usable medium having computer-readable program code means embodied therein for creating value in an electronic trade, the computer-readable program code means in the computer-program product comprising:
trading agent means, coupled to trading partners, for representing the trading partners in the electronic trade;
value manager means, coupled to the trading agent means, for managing true values, the true values being varying values of a product with varying attributes, the varying values being values of the products as perceived by the trading partners, the true values not being revealed to other trading partners;
wherein each trading agent submits a plurality of true values for the product corresponding to the varying attributes;
trade manager means, coupled to the trading agent means and receiving the true values from the trading agent means, for comparing true values from buyers and from sellers for various sets of attributes;
net value generator means, coupled to the trade manager means, for generating a net value for each set of attributes, the net value being a difference of a buyer sum and a seller sum, the buyer sum being a sum of the true values from trading agents representing buyers, the seller sum being a sum of the true values from trading agents representing sellers, the buyer sum and the seller sum being evaluated for a specific set of the attributes;
maximizer means, coupled to the trade manager means, for finding a set of the attributes that maximizes the net value; and
transaction reporter means, coupled to the trade manager means, for reporting the set of attributes that maximized the net value,
whereby the net value is maximized by selecting sets of the attributes of the product.

26. The computer-program product of claim 25 wherein the computer-readable program code means further comprises:
revenue manager means, coupled to the trade manager means, for allocating the net value among the trading partners and among an electronic exchange that hosts the electronic trade,
whereby the net value is allocated among trading partners and the electronic exchange.

27. The computer-program product of claim 26 wherein the computer-readable program code means further comprises:
weighting means, coupled to the revenue manager means, for allocating the net value among the trading partners based on weightings for each of the trading partners participating in the electronic trade,
whereby the net value is allocated based on weightings.

28. The computer-program product of claim 27 wherein the computer-readable program code means further comprises:
contribution means, coupled to the weighting means, for generating the weightings for the trading partners based on contribution to the net value, the contribution means including sun means for generating a sum-of-the-true-values sum of the true values of the trading partners participating in the electronic trade, the contribution means generating the weighting for the trading partner by dividing the true value from that trading partner with the sum-of-the-true-values sum,
whereby the net value is allocated based on contribution to the net value by each trading partner.

* * * * *